United States Patent
Jur et al.

(10) Patent No.: US 7,367,830 B2
(45) Date of Patent: May 6, 2008

(54) BUSWAY FITTING WITH SWITCH MOUNTED PERPENDICULAR TO PRIMARY AXIS

(75) Inventors: Arthur J. Jur, Greenwood, SC (US); Phillip D. Miller, Greenwood, SC (US); Douglas M. Brandt, Wampum, PA (US); Douglas V. Taylor, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 115 days.

(21) Appl. No.: 11/369,463

(22) Filed: Mar. 7, 2006

(65) Prior Publication Data

US 2007/0212932 A1    Sep. 13, 2007

(51) Int. Cl.
*H01R 4/60* (2006.01)
*H01R 25/00* (2006.01)

(52) U.S. Cl. ..................... 439/212; 439/114
(58) Field of Classification Search ........... 439/212, 439/114, 213, 115, 117, 507; 361/118, 365
See application file for complete search history.

(56) References Cited

U.S. PATENT DOCUMENTS

| | | | | |
|---|---|---|---|---|
| 4,082,933 A | * | 4/1978 | Nakata et al. | 200/253.1 |
| 4,180,846 A | * | 12/1979 | Wilson et al. | 361/643 |
| 4,532,574 A | | 7/1985 | Reiner et al. | |
| 5,162,616 A | * | 11/1992 | Swaffield et al. | 174/99 B |
| 5,982,611 A | * | 11/1999 | Campbell et al. | 361/664 |
| 6,012,937 A | | 1/2000 | Campbell et al. | |
| 6,411,486 B1 | | 6/2002 | Doneghue | |
| 6,561,844 B1 | | 5/2003 | Johnson | |
| 7,121,856 B2 | * | 10/2006 | Fontana et al. | 439/212 |
| 2004/0257184 A1 | * | 12/2004 | Meiners et al. | 335/202 |

* cited by examiner

*Primary Examiner*—Chandrika Prasad
(74) *Attorney, Agent, or Firm*—Martin J. Moran

(57) ABSTRACT

A busway fitting wherein the switch and/or fuse are disposed in a horizontal orientation. As the switch assembly and/or fuse are disposed in a horizontal orientation, the buses coupled to the switch assembly and/or fuse also extend horizontally. As such, the buses coupled to the switch assembly and/or fuse occupy a reduced amount of space. In this configuration, the transition buses may extend in a generally horizontal direction and, as such, the size of the busway fitting may be reduced.

20 Claims, 4 Drawing Sheets

BUSWAY FITTING WITH SWITCH MOUNTED PERPENDICULAR TO PRIMARY AXIS

BACKGROUND OF THE INVENTION

1. Field of the Invention

The present invention relates to a busway fitting and, more specifically, to a busway fitting having switch assemblies mounted perpendicular to the primary axis of the busway.

2. Background Information

A busway may be used to distribute power over an extended length, such as, but not limited to, through multiple floors of a building. The busway, typically, includes multiple busway sections each having a plurality of conductive members, or buses, disposed in an extruded housing. The housing, typically an aluminum extrusion, acts to support the bus members and to dissipate heat over most of the busway length. That is, the extruded housing is used to protect and support the bus members as the busway extends between floors. At selected locations, for example, on each floor, there is a busway fitting and a meter stack coupled to the power distribution system for that floor. The busway fitting is a housing structured to enclose the busway and any buses extending to the meter stack. The meter stack is, typically, disposed immediately to the side of the busway with a plurality of generally horizontal stabs extending toward the busway. A horizontal meter stack bus for each bus member in the busway extends between, and is in electrical communication with, the busway and the meter stack. Typically, the busway fitting also encloses a switch assembly that is disposed between the busway and the meter stack buses. Additionally, a fuse is often disposed between the switch and the meter stack. The switch assembly may be manually opened or closed to control the supply of electricity to the meter stack. Upon an over-current condition, the fuse will break the circuit between the meter stack and the busway.

In the prior art, the switch and fuse were mounted with their axis being generally parallel to the primary axis of the busway. That is, each switch and fuse had a line terminal and load terminal and these terminals extended in a direction parallel to the busway primary axis. Thus, in a typical busway fitting where the busway primary axis extended in a vertical direction, each meter stack bus was required to have one or more transition buses structured to join the vertical busway with the horizontal meter stack stabs. Typically, the transition buses included a right angle bend. This configuration is not optimal as the transition buses require extra space, extra parts, and labor related to their installation and maintenance.

There is, therefore, a need for a busway fitting wherein the switch and/or fuse extend in a horizontal orientation.

There is a further need for a busway fitting wherein the buses coupled to a switch and/or fuse occupy a reduced amount of space.

SUMMARY OF THE INVENTION

These needs, and others, are met by the present invention which provides a busway fitting wherein the switch and/or fuse are disposed in a horizontal orientation. As the switch and/or fuse are disposed in a horizontal orientation, the buses coupled to the switch and/or fuse also extend horizontally. As such, the buses coupled to the switch and/or fuse occupy a reduced amount of space. In this configuration, the transition buses may extend in a generally horizontal direction and, as such, the size of the busway fitting may be reduced.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "coupled" means a link between two or more elements, whether direct or indirect, so long as a link occurs.

As used herein, "directly coupled" means that two elements are directly in contact with each other.

As used herein, "encircle" means surround and does not require a shape similar to a geometric circle.

Figure 1:
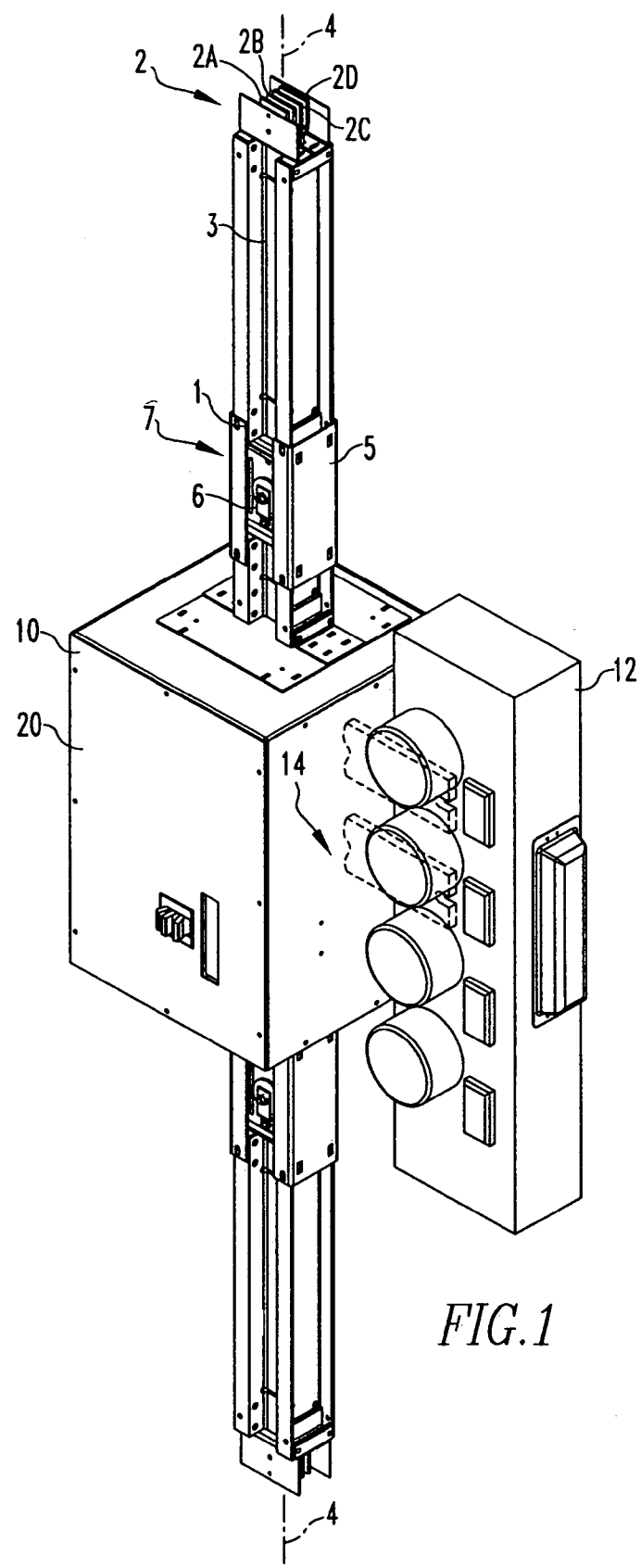
FIG. 1 is an isometric view of a busway fitting and a meter stack.

As shown in FIG. 1, a busway 1 includes at least one, and typically four, elongated bus members 2. Typically, three bus members 2A, 2B, 2C are "live" conductors coupled to a power source. The fourth bus member 2D is a neutral bus member 2. The bus members 2A, 2B, 2C, 2D are sandwiched in a non-conductive housing 3. The busway 1, typically, has a generally quadrilateral cross-sectional shape. The busway 1 has a primary axis 4 extending along the longitudinal axis and which is shown as extending in a vertical direction. It is understood that a busway 1 may extend in any orientation. The busway housing 3 has lateral openings (not shown) structured to allow a busway fitting bus assembly 90 (described below) to be coupled to, and in electrical communication with, the bus members 2. At selected locations along the busway 1 there are busway fittings 10 that are typically coupled to a meter stack 12. The meter stack 12 has at least one stab 14, that is, a conductor, extending toward the busway fitting 10 and structured to be coupled to the busway fitting bus assembly 90.

The busway fitting 10 includes a housing assembly 20 and a current interruption assembly 50. The housing assembly 20 includes a generally planar first end member 22 with at least one opening 24, a generally planar second end member 26 with at least one opening 28, a generally planar front side member 30 having a door (not shown) thereon, a generally planar first lateral side member 32, a generally planar second lateral side member 34, and a generally planar back side member 36. The first end member 22, the second end member 26, and the side members 30, 32, 34, 36 form a box-like enclosure 40 about the busway 1. The busway 1 extends generally through the middle of the enclosure 40 and passes through the first end member 22 at least one opening 24 and the second end member 26 at least one opening 28. Thus, the busway 1 has a first side 5 adjacent to and facing the first lateral side member 32, a front side 6 adjacent to and facing the front side member 30, and a second side 7 adjacent to and facing the second lateral side member 34. The first lateral side member 32 has an opening 33 disposed adjacent to the meter stack stabs 14. The second lateral side member 34 may also have an opening 35 so that a meter stack 12 or other device may be disposed on the other side of the housing assembly 20.

The current interruption assembly 50, preferably, includes both at least one switch assembly 60 and/or at least one fuse 80 and a bus assembly 90. As noted above, the typical busway 1 has three live bus members 2A, 2B, 2C and there is typically one switch assembly 60 and/or at least one fuse 80 associated with each bus member 2. Accordingly, the following description shall be addressed to a busway fitting 10 configured with three switch assemblies 60A, 60B, 60C and/or three fuses 80A, 80B, 80C. There may, however, be more or less than three of each component in a busway fitting 10. Each switch assembly 60A, 60B, 60C includes an operating mechanism 62 and two contacts (not shown). The operating mechanism 62 is structured to move the contacts between a first position, wherein the contacts are in electrical communication, and a second position, wherein the contacts are not in electrical communication. Each switch assembly 60A, 60B, 60C also includes a line terminal 64 and a load terminal 66 disposed on opposite sides of the operating mechanism 62. A switch assembly axis 68 extends between the switch assembly line terminal 64 and the switch assembly load terminal 66. Each line terminal 64 and load terminal 66 is structured to be coupled to a member of the busway fitting bus assembly 90. Where there is more than one switch assembly 60A, 60B, 60C, the current interruption assembly 50 may also include a linking device 70. The linking device 70 is structured to operatively link the switch assemblies 60A, 60B, 60C. The linking device 70 has a handle 72 extending outside the housing assembly 20. Each fuse 80A, 80B, 80C also includes a line terminal 82 and a load terminal 84. Each line terminal 82 and load terminal 84 is structured to be coupled to a member of the busway fitting bus assembly 90.

The busway fitting bus assembly 90 includes at least one first transition bus 92 and at least one second transition bus 94. Where there is both a switch assembly 60 and a fuse 80, there is also at least one third transition bus 96. Again, in a typical busway there are three live bus members 2A, 2B, 2C. For each bus member 2A, 2B, 2C there is one first transition bus 92A, 92B, 92C, one second transition bus 94A, 94B, 94C, and one third transition bus 96A, 96B, 96C. Each first transition bus 92A, 92B, 92C is structured to be coupled to, and in electrical communication with, both one busway bus member 2A, 2B, 2C and one switch assembly 60A, 60B, 60C line terminal 64. Each first transition bus 92A, 92B, 92C extends in a direction generally perpendicular to the primary axis 4 of the busway 1. As such, each switch assembly axis 68 of each switch assembly 60A, 60B, 60C coupled to a first transition bus 92A, 92B, 92C may also extend in a direction generally perpendicular to the primary axis 4 of the busway 1.

In a preferred embodiment, each switch assembly 60A, 60B, 60C is disposed between the busway front side 6 and the housing assembly front side member 30. In this configuration, the switch assembly 60A, 60B, 60C may be accessed via the door on the housing assembly front side member 30. Accordingly, each first transition bus 92A, 92B, 92C is preferably coupled to the busway bus members 2A, 2B, 2C on the busway first side 5. Each first transition bus 92A, 92B, 92C has a first portion 100 that wraps around, that is, partially encircles, the busway 1 and a second, generally planar portion 102 extending between the busway front side 6 and the housing assembly front side member 30. Each switch assembly line terminal 64 is coupled to a first transition bus 92A, 92B, 92C at the distal end of each first transition bus second portion 102.

Where a busway fitting 10 includes fuses 80A, 80B, 80C as well as switch assemblies 60A, 60B, 60C, it is also preferred that the fuses 80A, 80B, 80C be disposed between the busway front side 6 and the housing assembly front side member 30 so that the fuses 80A, 80B, 80C may be accessed via the door on the housing assembly front side member 30. To allow both the switch assemblies 60A, 60B, 60C and the fuses 80A, 80B, 80C to be between the busway front side 6 and the housing assembly front side member 30, the fuses 80A, 80B, 80C may be axially spaced from the switch assemblies 60A, 60B, 60C. That is, each third transition bus 96A, 96B, 96C extends in a direction parallel to the primary busway axis 4. Thus, each third transition bus 96A, 96B, 96C includes a first portion 110, a second portion 112, and a third portion 114. The third transition bus first portion 110 extends in a direction generally perpendicular to the busway primary axis 4. The third transition bus second portion 112 extends in a direction generally parallel to the busway primary axis 4. The third transition bus third portion 114 extends in a direction generally perpendicular to said busway primary axis 4. Each third transition bus first portion 110 is structured to be coupled to a switch assembly load terminal 66. Each third transition bus third portion 114 is structured to be coupled to a fuse line terminal 82. Each third transition bus third portion 114 partially wraps around the busway 1 so that each fuse 80A, 80B, 80C may be disposed between the busway front side 6 and the housing assembly front side member 30.

Each second transition bus 94A, 94B, 94C is structured to be coupled to both, and in electrical communication with, a switch assembly load terminal 66 and a meter stack stab 14. Where the busway fitting 10 includes fuses 80A, 80B, 80C, the second transition bus 94A, 94B, 94C is coupled indirectly to the switch assembly load terminal 66 via a fuse 80 and a third transition bus 96. In this configuration, each second transition bus 94A, 94B, 94C has a generally planar first portion 120 extending adjacent to the busway front side 6 and a second portion 122 wrapping around the busway 1. As such, each second transition bus 94A, 94B, 94C extends in a direction generally perpendicular to the busway primary axis 4. The second transition bus 94A, 94B, 94C first portion 120 is coupled directly to a fuse load terminal 84. The second transition bus 94A, 94B, 94C may also include a third portion 124. The second transition bus third portion 124 extends generally parallel to the housing assembly back side member 36. The second transition bus third portion 124 has a first end 126 and a second end 128. Each second transition bus third portion first end 126 is structured to be coupled to a meter stack stab 14 and is disposed adjacent to the first lateral side member opening 33. Each second transition bus third portion second end 128 is structured to be coupled to a meter stack stab 14 and is disposed adjacent to the second lateral side member opening 35.

The present invention may also be practiced with a busway fitting 10 that has only a switch assembly 60 or a fuse 80. Is this configuration (not shown), there is only a need for a first transition bus 92 and a second transition bus 94; and the second transition bus first portion 120 is coupled directly to the switch/fuse load terminal 66/84.

Figure 2:
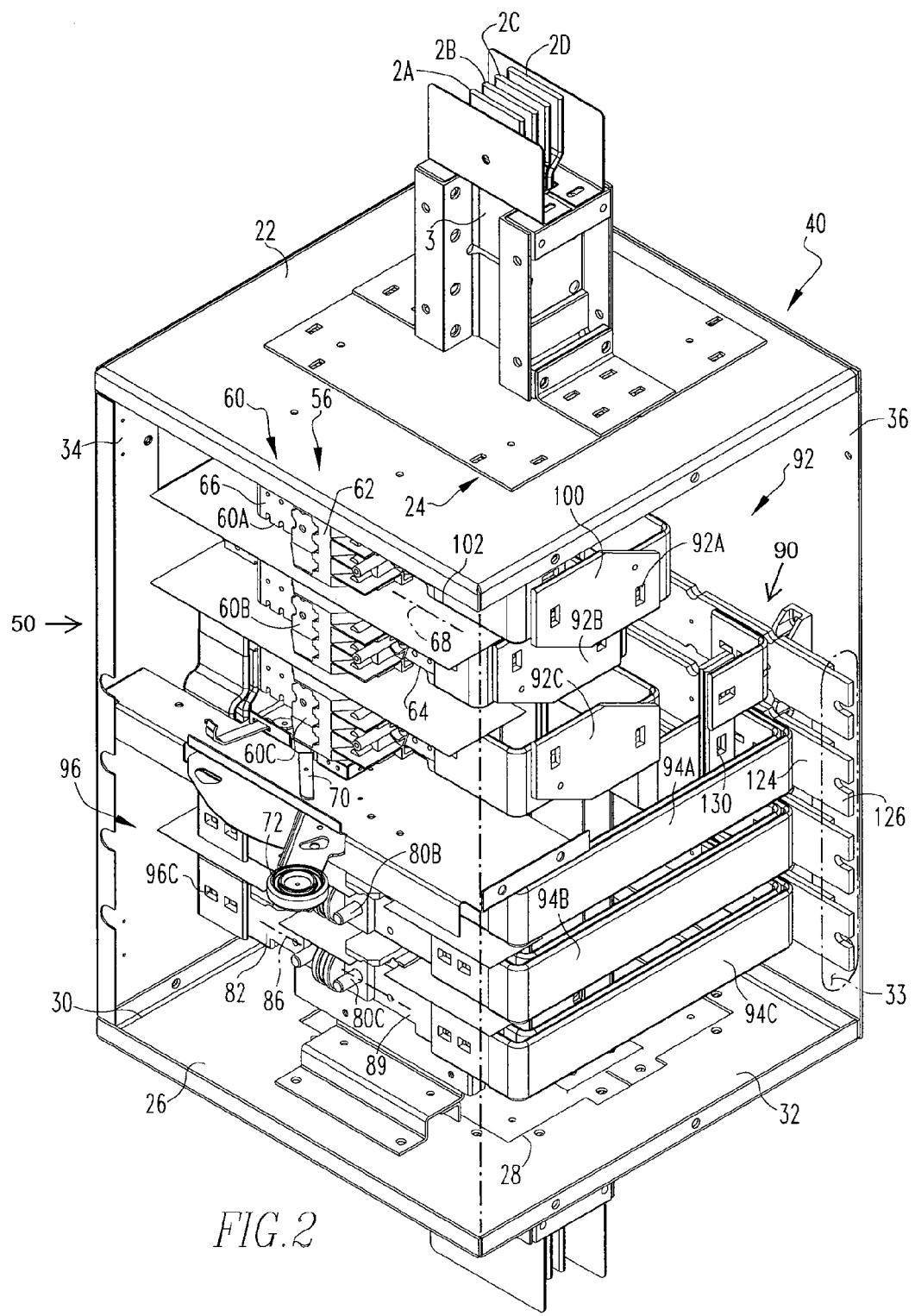
FIG. 2 is an isometric cut away view of a busway fitting.
Figure 3:
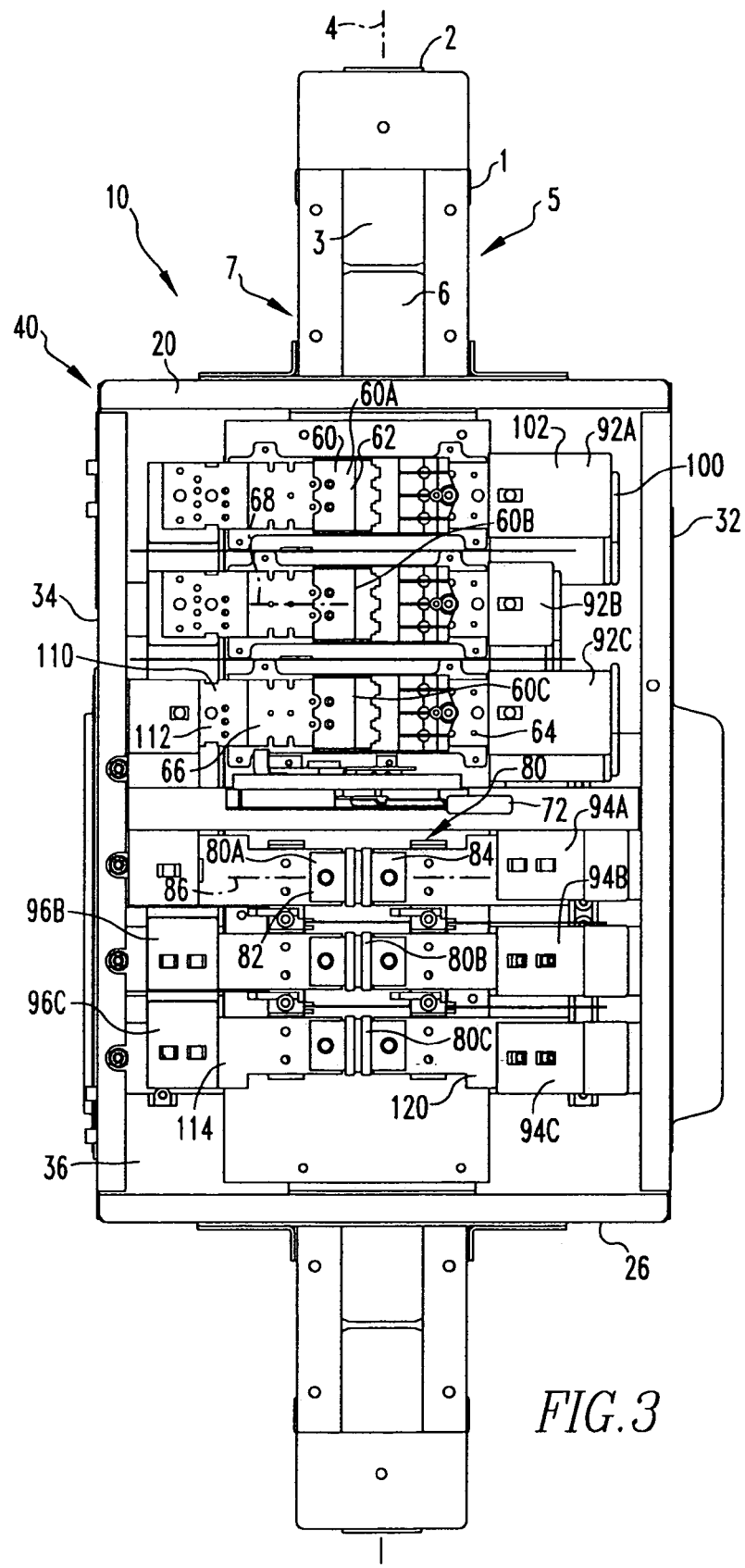
FIG. 3 is front view of a busway fitting.
Figure 4:
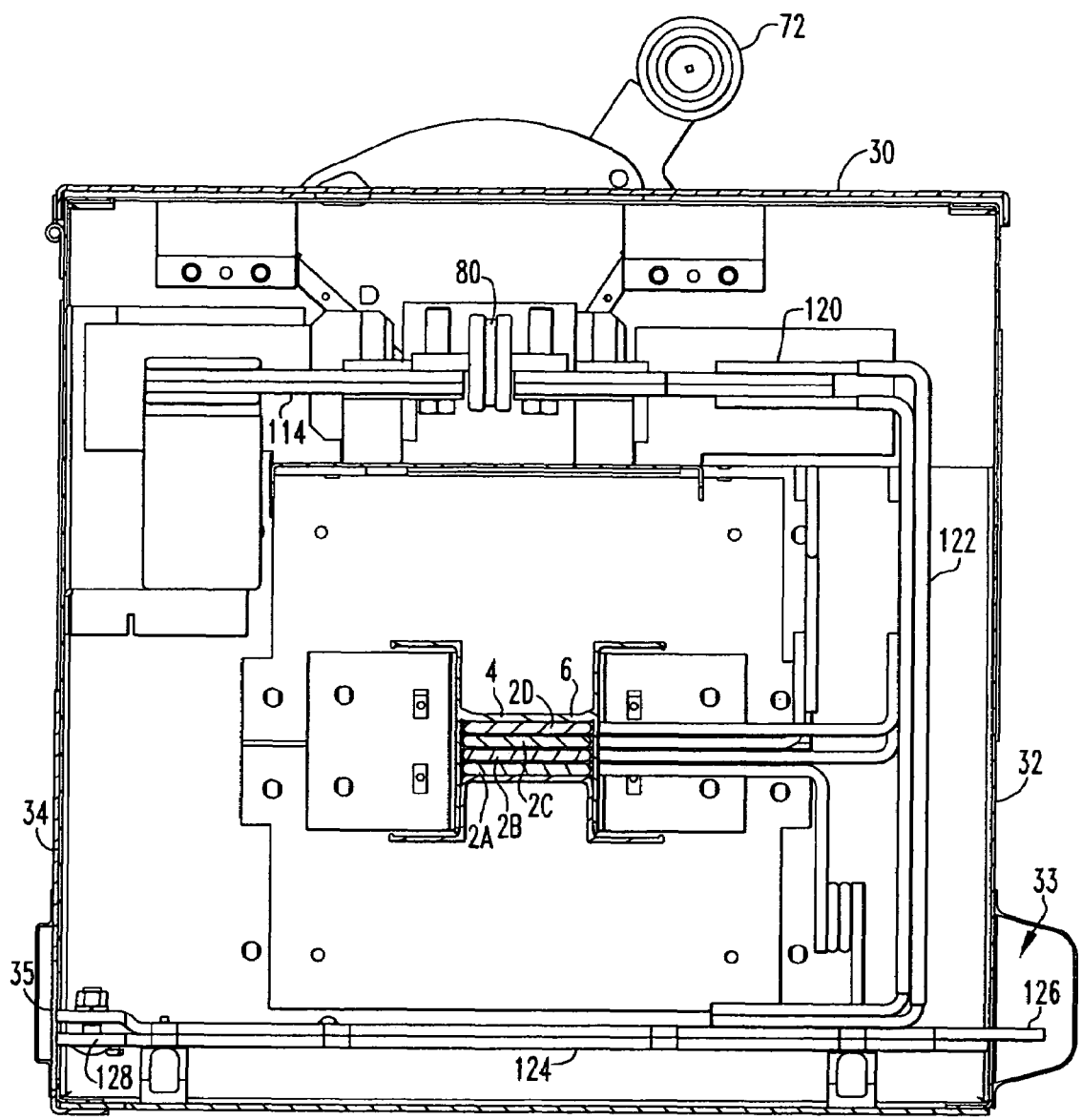
FIG. 4 is a bottom view of a busway fitting.

As also shown in FIG. 2, the busway fitting bus assembly 90 may include a neutral bus 130. The neutral bus 130 is not coupled to a switch assembly 60 or a fuse 80. The neutral bus 130 is structured to extend from the neutral bus member 2 to a neutral meter stack stab 14.

While specific embodiments of the invention have been described in detail, it will be appreciated by those skilled in the art that various modifications and alternatives to those details could be developed in light of the overall teachings of the disclosure. For example, instead of having a door on the housing assembly front side member 30, doors may be disposed on each lateral side. Thus, a switch assembly 60 could be located on one side and a fuse 80 could be located on the other side 32, 34. In this configuration, the third transition bus 96 need not extend in a direction parallel to the busway primary axis 4. Instead, the third transition bus 96 would simply wrap around the busway 1. Accordingly, the particular arrangements disclosed are meant to be illustrative only and not limiting as to the scope of invention which is to be given the full breadth of the claims appended and any and all equivalents thereof.

What is claimed is:

1. A busway fitting disposed upon an elongated busway, said busway having an elongated at least one bus member and a primary axis, said busway structured to be coupled to a meter stack, said meter stack having at least one stab extending in a direction generally perpendicular to said busway primary axis; said busway fitting comprising:
   a housing assembly;
   a current interruption assembly having at least one switch assembly disposed within said housing assembly;
   said at least one switch assembly having an operating mechanism, a line terminal and a load terminal, and an axis extending between said switch assembly line terminal and said switch assembly load terminal, said switch axis extending in a direction generally perpendicular to said busway primary axis;
   a bus assembly having at least an elongated first transition bus and an elongated second transition bus;
   said first transition bus coupled to, and in electrical communication with, both said busway at least one bus member and said switch assembly line terminal, said at least one first transition bus extending in a direction generally perpendicular to said busway primary axis; and
   said second transition bus coupled to, and in electrical communication with, both said switch assembly load terminal and said at least one meter stack stab, said at least one second transition bus extending in a direction generally perpendicular to said busway primary axis.

2. The busway fitting of claim 1 wherein:
   said current interruption assembly includes at least one fuse;
   said at least one fuse having a line terminal and a load terminal, and an axis extending between said fuse line terminal and said fuse load terminal, said fuse axis extending in a direction generally perpendicular to said busway primary axis;
   said bus assembly includes a third transition bus;
   said third transition bus coupled to, and in electrical communication with, both said switch assembly load terminal and said fuse line terminal;
   said third transition bus being directly coupled to, and in electrical communication with, said fuse load terminal; and
   wherein said second transition bus is coupled indirectly to said switch assembly load terminal via said at least one fuse and said third transition bus.

3. The busway fitting of claim 2 wherein said busway includes three live bus members and said meter stack includes three live stabs, and wherein:
   said current interruption assembly includes three switch assemblies;
   said bus assembly includes three elongated first transition buses and three elongated second transition buses;
   each said first transition bus coupled to, and in electrical communication with, both one said busway live bus member and one said switch assembly line terminal, each said first transition bus extending in a direction generally perpendicular to said busway primary axis; and
   each said second transition bus coupled to, and in electrical communication with, both one said switch assembly load terminal and one said live meter stack stab, each said second transition bus extending in a direction generally perpendicular to said busway primary axis.

4. The busway fitting of claim 3 wherein:
   said current interruption assembly includes three fuses;
   said bus assembly includes three third transition buses;
   each third transition bus coupled to, and in electrical communication with, one said switch assembly load terminal and said fuse line terminal;
   each said second transition bus being directly coupled to, and in electrical communication with, one said fuse load terminal; and
   wherein each said second transition bus is coupled indirectly to one said switch assembly load terminal via one said fuse and one said third transition bus.

5. The busway fitting of claim 4 wherein each said third transition bus includes a first portion, a second portion, and a third portion, said third transition bus first portion extending in a direction generally perpendicular to said busway primary axis, said third transition bus second portion extending in a direction generally parallel to said busway primary axis, and third transition bus third portion extending in a direction generally perpendicular to said busway primary axis.

6. The busway fitting of claim 5 wherein:
   said housing assembly includes a generally planar first end member with at least one opening, a generally planar second end member with at least one opening, a generally planar front side member having a door thereon, a generally planar first lateral side member, a generally planar second lateral side member, and a generally planar back side member;
   said first end member, said second end member, and said side members form a box-like enclosure about said busway, said busway extending generally through the middle of said enclosure and passing though said first end member at least one opening and said second end member at least one opening, said busway having a first side adjacent to and facing said first lateral side member, a front side adjacent to and facing said front side member, and a second side adjacent to and facing said second lateral side member;
   each said first transition bus coupled to said busway at said busway first side, each said first transition bus having a first portion wrapping around said busway and having a generally planar second portion extending adjacent to said busway front side; and
   each said switch assembly disposed between said housing front side member and said busway front side.

7. The busway fitting of claim 6 wherein said current interruption assembly includes a linking device, said linking device structured to operatively link the three switch assemblies, said linking device having a handle extending outside said housing assembly.

8. The busway fitting of claim 6 wherein:
   each said second transition bus has a generally planar first portion extending adjacent to said busway front side and a second portion wrapping around said busway; and each said fuse disposed between said housing front side member and said busway front side.

9. The busway fitting of claim 8 wherein:
said housing assembly first lateral side member has an opening;
each said second transition bus has a third portion extending generally parallel to said housing assembly back side member and having a first end; and
said second transition bus third portion first end disposed adjacent to said first lateral side member opening, said second transition bus third portion first end structured to be coupled to a meter stack stab.

10. The busway fitting of claim 9 wherein:
said housing assembly second lateral side member has an opening;
each said second transition bus has a third portion has a second end; and
said second transition bus third portion second end disposed adjacent to said second lateral side member opening, said second transition bus third portion second end structured to be coupled to a meter stack stab.

11. The busway fitting of claim 1 wherein said busway includes three live bus members and said meter stack includes three live stabs, and wherein:
said current interruption assembly includes three switch assemblies;
said bus assembly includes three elongated first transition buses and three elongated second transition buses;
each said first transition bus coupled to, and in electrical communication with, both one said busway live bus member and one said switch assembly line terminal, each said first transition bus extending in a direction generally perpendicular to said busway primary axis; and
each said second transition bus coupled to, and in electrical communication with, both one said switch assembly load terminal and one said live meter stack stab, each said second transition bus extending in a direction generally perpendicular to said busway primary axis.

12. The busway fitting of claim 11 wherein:
said housing assembly includes a generally planar first end member with at least one opening, a generally planar second end member with at least one opening, a generally planar front side member having a door thereon, a generally planar first lateral side member, a generally planar second lateral side member, and a generally planar back side member;
said first end member, said second end member, and said side members form a box-like enclosure about said busway, said busway extending generally though the middle of said enclosure and passing through said first end member at least one opening and said second end member at least one opening, said busway having a first side adjacent to and facing said first lateral side member, a front side adjacent to and facing said front side member, and a second side adjacent to and facing said second lateral side member;
each said first transition bus coupled to said busway at said busway first side, each said first transition bus having a first portion wrapping around said busway and having a generally planar second portion extending adjacent to said busway front side; and
each said switch assembly disposed between said housing front side member and said busway front side.

13. The busway fitting of claim 12 wherein:
said housing assembly first lateral side member has an opening;

each said second transition bus has a generally planar first portion extending adjacent to said busway front side, a second portion wrapping around said busway, and a third portion extending generally parallel to said housing assembly back side member and having a first end; and
said second transition bus third portion first end disposed adjacent to said first lateral side member opening, said second transition bus third portion first end structured to be coupled to a meter stack stab.

14. The busway fitting of claim 13 wherein:
said housing assembly second lateral side member has an opening;
each said second transition bus has a third portion has a second end; and
said second transition bus third portion second end disposed adjacent to said second lateral side member opening, said second transition bus third portion second end structured to be coupled to a meter stack stab.

15. The busway fitting of claim 12 wherein said current interruption assembly includes a linking device, said linking device structured to operatively link the three switch assemblies, said linking device having a handle extending outside said housing assembly.

16. A busway fitting disposed upon an elongated busway, said busway having an elongated at least one bus member and a primary axis, said busway structured to be coupled to a meter stack, said meter stack having at least one stab extending in a direction generally perpendicular to said busway primary axis; said busway fitting comprising:
a housing assembly;
a current interruption assembly having at least one fuse disposed within said housing assembly;
said at least one fuse having a line terminal and a load terminal, and an axis extending between said fuse line terminal and said fuse load terminal, said fuse axis extending in a direction generally perpendicular to said busway primary axis;
a bus assembly having at least an elongated first transition bus and an elongated second transition bus;
said first transition bus coupled to, and in electrical communication with, both said busway at least one bus member and said fuse line terminal, said at least one first transition bus extending in a direction generally perpendicular to said busway primary axis; and
said second transition bus coupled to, and in electrical communication with, both said fuse load terminal and said at least one meter stack stab, said at least one second transition bus extending in a direction generally perpendicular to said busway primary axis.

17. The busway fitting of claim 16 wherein said busway includes three live bus members and said meter stack includes three live stabs, and wherein:
said current interruption assembly includes three fuses;
said bus assembly includes three elongated first transition buses and three elongated second transition buses;
each said first transition bus coupled to, and in electrical communication with, both one said busway live bus member and one said fuse line terminal, each said first transition bus extending in a direction generally perpendicular to said busway primary axis; and
each said second transition bus coupled to, and in electrical communication with, both one said fuse load terminal and one said live meter stack stab, each said second transition bus extending in a direction generally perpendicular to said busway primary axis.

18. The busway fitting of claim 17 wherein:

said housing assembly includes a generally planar first end member with at least one opening, a generally planar second end member with at least one opening, a generally planar front side member having a door thereon, a generally planar first lateral side member, a generally planar second lateral side member, and a generally planar back side member;

said first end member, said second end member, and said side members form a box-like enclosure about said busway, said busway extending generally though the middle of said enclosure and passing through said first end member at least one opening and said second end member at least one opening, said busway having a first side adjacent to and facing said first lateral side member, a front side adjacent to and facing said front side member, and a second side adjacent to and facing said second lateral side member;

each said first transition bus coupled to said busway at said busway first side, each said first transition bus having a first portion wrapping around said busway and having a generally planar second portion extending adjacent to said busway front side; and each said fuse disposed between said housing front side member and said busway front side.

19. The busway fitting of claim 18 wherein:

said housing assembly first lateral side member has an opening;

each said second transition bus has a generally planar first portion extending adjacent to said busway front side, a second portion wrapping around said busway, and a third portion extending generally parallel to said housing assembly back side member and having a first end; and said second transition bus third portion first end disposed adjacent to said first lateral side member opening, said second transition bus third portion first end structured to be coupled to a meter stack stab.

20. The busway fitting of claim 19 wherein:

said housing assembly second lateral side member has an opening;

each said second transition bus third portion has a second end; and said second transition bus third portion second end disposed adjacent to said second lateral side member opening, said second transition bus third portion second end structured to be coupled to a meter stack stab.

* * * * *